Sept. 25, 1934.  C. D. TERRY  1,975,026
COLLISION BRAKING DEVICE FOR VEHICLES
Filed Aug. 2, 1933  4 Sheets-Sheet 1

Sept. 25, 1934.   C. D. TERRY   1,975,026
COLLISION BRAKING DEVICE FOR VEHICLES
Filed Aug. 2, 1933   4 Sheets-Sheet 3
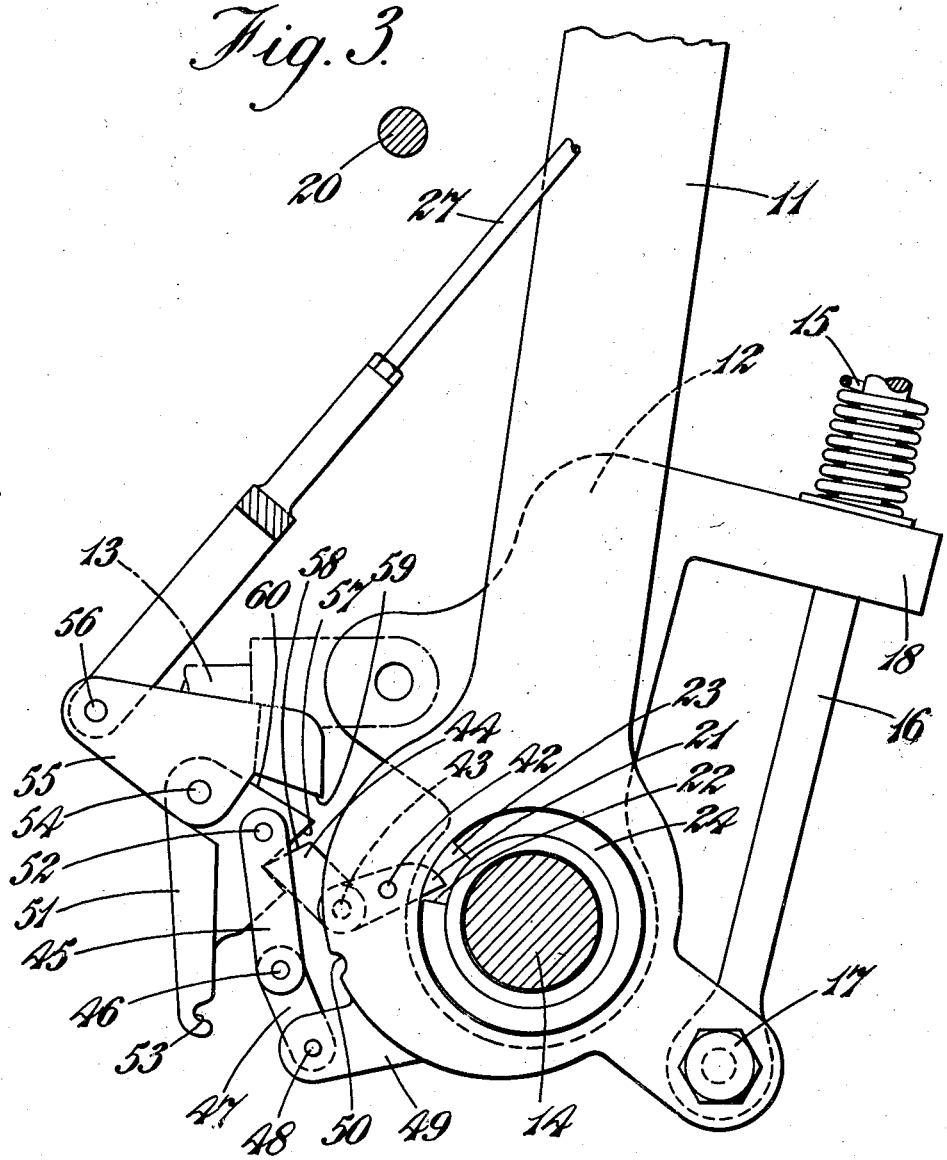
Fig. 3.
INVENTOR
C. D. TERRY
BY
ATTY.

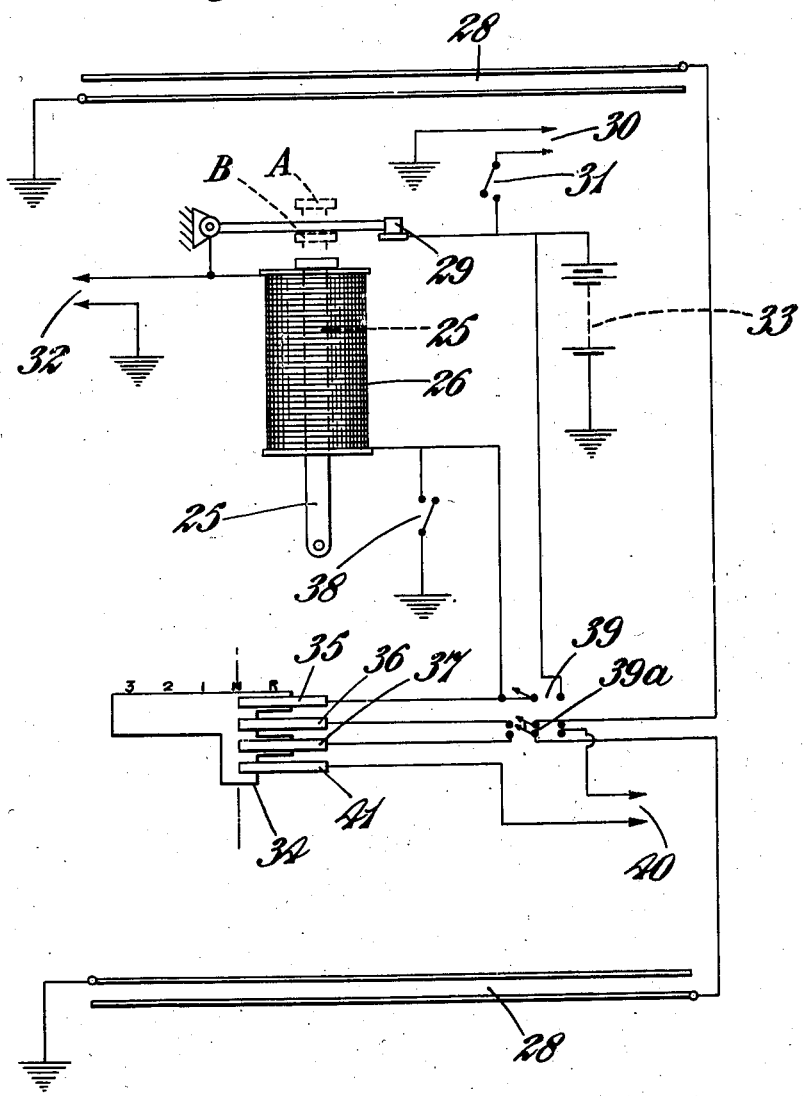

Patented Sept. 25, 1934

1,975,026

UNITED STATES PATENT OFFICE 1,975,026

COLLISION BRAKING DEVICE FOR VEHICLES

Cyril Douglas Terry, Moseley, England

Application August 2, 1933, Serial No. 683,373
In Great Britain August 11, 1932

8 Claims. (Cl. 180—83)

This invention relates to devices for applying automatically the brakes of a vehicle in the event of a guard member, such as a bumper bar or fender carried by the vehicle coming into contact with an obstruction and in which a detent, serving normally to maintain a spring so much stressed that when released said spring will be capable of exerting the necessary force for applying the brakes, is controlled by the armature of a solenoid the winding of which latter is included in the circuit of a switch comprised or operated by a guard member; the device being reset after application of the brakes thereby ready for a subsequent operation by normal brake applying movement of the usual brake lever.

The invention has for an object to provide improvements in such devices, and to this end in a collision braking device in which a detent, serving normally to maintain a spring so much stressed that when released it will be capable of exerting the necessary force for applying the brakes, is connected with a guard member, so as to be withdrawn when the latter comes into contact with an obstruction, and which device after application of the brakes thereby may be reset for a subsequent operation by normal brake applying effort. According to the invention the spring is interposed between a brake lever and an auxiliary lever mounted to move normally as one therewith.

Figure 1:
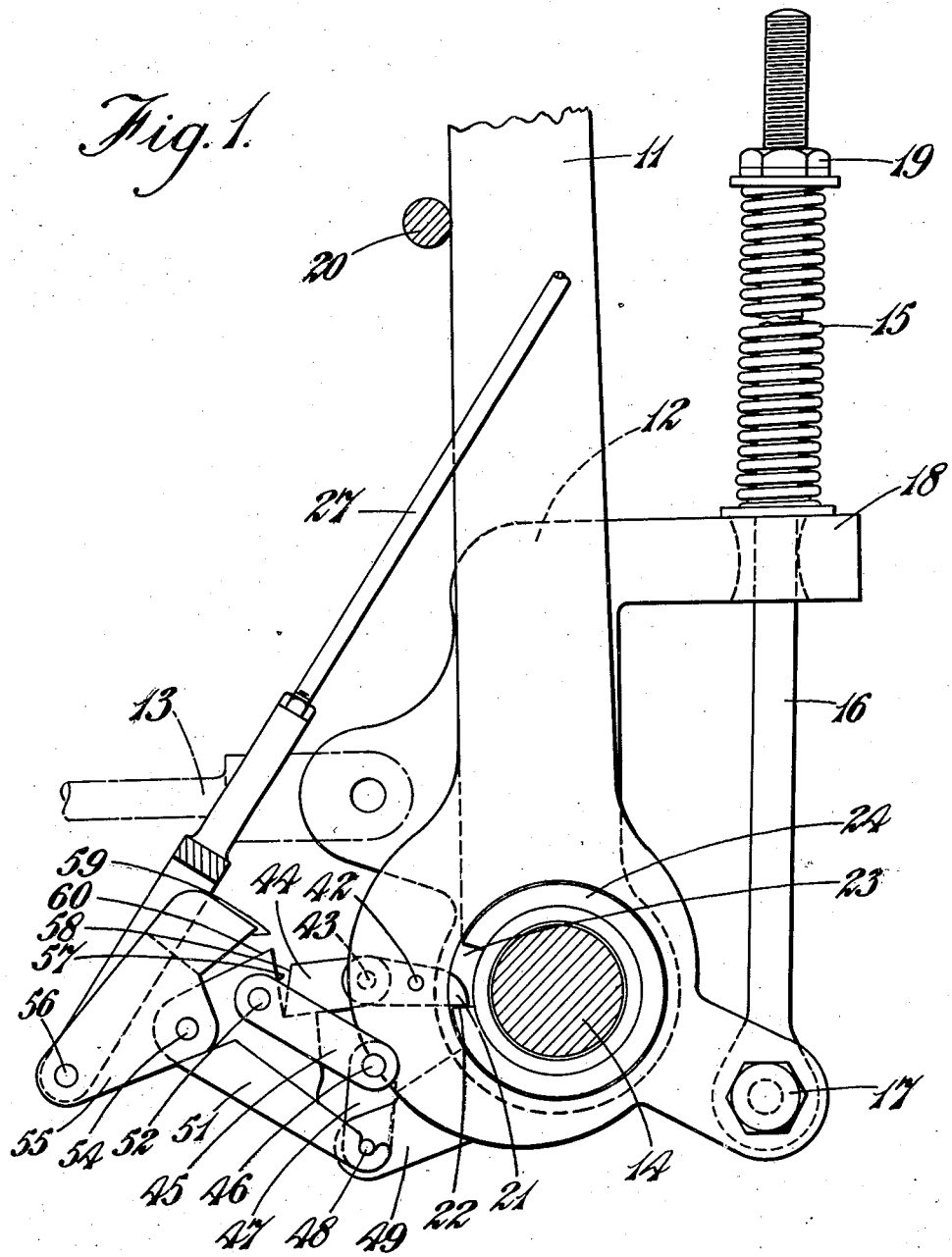
Figure 2:
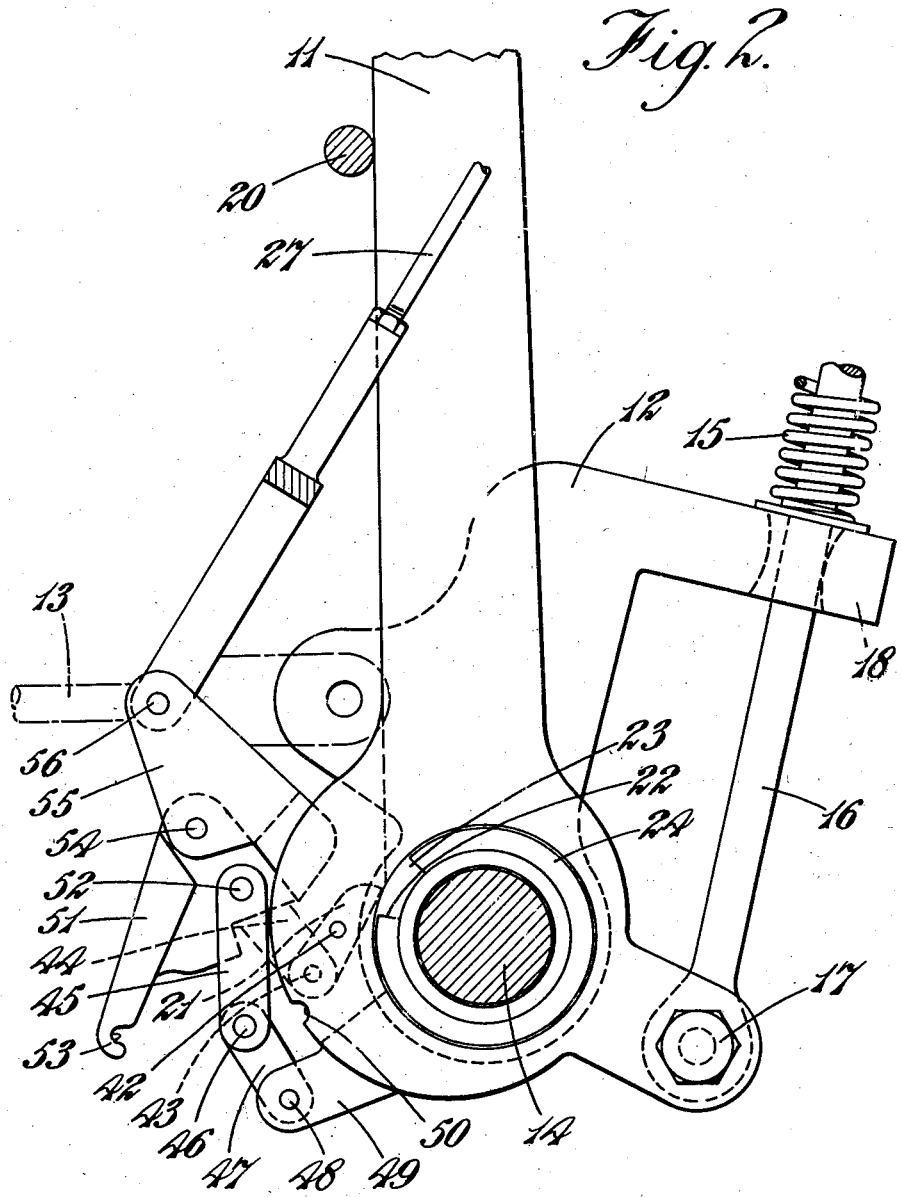

One form of the invention is illustrated by the accompanying diagrammatic drawings, of which Figures 1, 2 and 3 are fragmentary views showing in elevation different positions assumed by a brake pedal and parts associated therewith; whilst, Figure 4 is a diagram showing the remainder of the apparatus and the electrical connections thereof.

As shown, a brake pedal 11 of normal type and a lever 12, movable independently of the pedal 11 to apply the brakes which are connected therewith by a rod 13, are fulcrumed upon a common spindle 14, and a coiled compression spring 15 capable of storing sufficient energy to apply the brakes is interposed therebetween by being threaded over a rod 16 coupled pivotally with the pedal 11 as at 17, and bearing at one end against an apertured lug 18 of the lever 12 and at its other end against an adjustable abutment constituted by lock nuts 19 threaded on the rod 16; the action of the spring being to tend to move the pedal 11 and lever 12 apart from one another about the spindle 14 in anti-clockwise and clockwise directions, respectively. What may be termed the return movement of the pedal 11 is limited in the usual way by a stop indicated at 20 so that the spring 15 acts upon the lever 12 with the pedal 11 as an abutment and will thus, when released, apply the brakes.

A detent in the form of a pawl 21 mounted upon the pedal 11 serves, under the control of means described below, by its co-operation with a shoulder 22 forming one end of a slot 23 cut in a flange 24 on the lever 12, to maintain the spring 15 compressed, and, as what may be termed the forward, or applying, movement of the lever 12 is limited by the brake shoes (not shown) coming into contact with the brake drums (not shown), depression of the pedal 11 when the spring 15 is released and has moved the lever 12 and thus applied the brakes, will result in the compression once more of the spring 15 and in movement of the detent pawl 21 to co-operate once more between the pedal 11 and lever 12 and maintain the spring 15 in its compressed or normal condition.

Referring now to Figure 4 of the drawings, the armature 25 of an electric solenoid 26 co-operates via a rod 27 (Figure 3) with the mechanism to be described controlling the detent pawl 21 and the winding of the solenoid 26 is included in an electric circuit containing in series what will be termed a bumper switch 28 so that, when the latter is closed upon impact with an obstacle, the solenoid armature 25 will rise, and shift the detent pawl 21, so releasing the spring and thus resulting in instantaneous application of the brakes of a vehicle to which the device is applied. The solenoid has also associated therewith a switch 29 through which the solenoid winding is connected in circuit and through which also the ignition, starter motor, and all of the electrical components of a vehicle, except for the side and rear lamps, are connected in circuit. It will be seen, therefore, that when the armature 25 rises, the solenoid itself is de-energized and all the electrical components except the side and rear lamps rendered inoperative. Leads to the side and rear lamps are indicated in Figure 4 at 30, a switch for controlling them at 31, and leads to the other electrical components at 32, whilst the main battery of the electric installation, is indicated at 33.

It will be observed that the circuit through the solenoid 26 is completed through a switch 34 and one or other of the bumper switches 28.

In the case in question, there are two bumper switches 28, that shown uppermost on the drawings being mounted at the front of a vehicle and that shown lowermost on the drawings at the rear thereof, and, in order that the appropriate bumper switch only, shall be "live" according to the direction in which the vehicle is travelling, the switch 34 is of the barrel type, the barrel thereof being associated mechanically with the gear lever (not shown). Connection is established between the solenoid 26 and the moving barrel of the switch 34 by a contact brush 35, while contact brushes 36 and 37 establish connection between said barrel and the forward and rear bumper switches 28, respectively. The switch 34 is shown in the position which it occupies when the gear lever (not shown) is in the neutral position and it will be apparent from Figure 4, in which the other positions of the gear lever are indicated by the symbols R, N, 1, 2, 3, that when any forward gear is engaged, the forward switch 28 only is live, that when the gear lever is in neutral both switches 28 will be live and that when reverse gear is engaged the rear switch 28 only is live.

In order that apparatus may be actuated independently of the bumper switches 28 as may be desirable, for example, in the event of collapse of the driver of the vehicle, a manually operable switch 38 is provided so that an occupant of the vehicle may close it and so complete the circuit through the solenoid.

In order that, for example, when a vehicle is stationary, the solenoid 26 may be rendered inoperative and a horn only sounded upon the closing of either bumper switch 28, switches 39 and 39a, operable by a common control, are provided, the one 39 enabling the solenoid and switch 29 to be short circuited and the other 39a enabling the bumper switches 28, 28 to be connected with one of a pair of leads 40 to a horn, instead of to the contacts 36 and 37 of the switch 34. As in such circumstances the gear control of the vehicle will be in the neutral position, a brush 41 serves to connect the horn in circuit only when the gear lever is in the neutral position. Thus when the switch 39 is closed and the switch 34 is in the position shown, contact with either bumper switch 28 will simply result in the sounding of the horn.

It will be observed that various means can be employed for controlling the detent pawl 21, but in the case in question and as shown in Figures 1, 2 and 3, the pawl 21 is fulcrumed at 42 upon the pedal 11 and pivotally connected at 43 with one arm 44 of a bell crank lever 44, 45, the arm 45 of which is pivotally connected at 46 with the free end of a link 47 which, in turn, is mounted pivotally at 48 upon an extension 49 of the pedal 11. It will be seen that the bell crank lever 44, 45 constitutes a rigid link between the pivotal connections 43 and 46 and serves as a rigid member of a toggle-like linkage. Normally the pressure of the shoulder 22 of the lever 12 upon the pawl 21 is resisted by the toggle linkage just mentioned, the centre pin 46 of which is caused by the pressure of said shoulder 22 to bear against a seating 50 (see Figures 2 and 3) formed for the purpose in the pedal 11. It will, moreover, be seen that the centre pin 46 normally occupies a position to one side of a dead centre which lies upon a line intersecting the fixed pivotal connection 48 and the normal position of the pivotal interconnection 43, and that once the centre pin 46 is caused to move to the other side of said dead centre position, the pressure of the shoulder 22 upon the pawl 21 will cause the pawl 21 to rock about its fulcrum 42 in an anticlockwise direction, the toggle linkage 44, 45 and 47 moving to the position shown in Figure 2 with the result that the pawl 21 will be clear of the shoulder 22 and the lever 12 will move under the influence of the spring 15 to the position shown in Figure 2, so applying the brakes.

In order to prevent accidental movement of the centre pin 46 (as might otherwise be caused by vibration) to said other side of said dead centre position a member 51 upon which the bell crank lever 44, 45 is fulcrumed at 52, is formed with a recess 53 (see Figure 2) which engages a projecting end of the pivotal attachment pin 48. Thus, so long as said pin 48 and recess 53 are in engagement the toggle linkage 44, 45 and 47 cannot move from the position shown in Figure 1. The fulcrum member 51 has also fulcrumed thereon at 54 an impact lever 55 connected pivotally as at 56 with the rod 27 of the solenoid armature 25.

It will be observed that an upward pull upon the fulcrum 52 of the bell crank lever 44, 45 will tend to throw the toggle linkage 45, 47 through the dead centre position and so release the lever 12 for movement under the influence of the spring 15; and, in order to enable such movement to take place with certainty under the action of the solenoid 26, the fulcrum member 51 is formed with a striking face 57 adapted to engage a complementary impact face 58 on the bell crank lever 44, 45 whilst the impact lever 55 is formed similarly with a striking face 59 adapted to be brought into contact with a complementary impact face 60 on the fulcrum member 51. By reference to Figures 1 and 2 of the drawings it will be seen that when the rod 27 is pulled upwardly by the rising of the solenoid armature 25, the striking face 59 will be caused to strike the impact face 60, the resulting impact ensuring that the fulcrum member 51 shall move about the fulcrum 52 and free the recess 53 thereof from the pin 48 and, subsequently, the striking face 57 will strike the impact face 58 the resulting impact ensuring that sufficient force shall be applied to said bell crank lever 44, 45 to move the pawl 21 about its pivot 42, first to a very small extent in a clockwise direction against the spring 15, to permit the toggle linkage 45, 47 to reach the dead centre position, and then pass therethrough to permit the pawl 21 to ride clear of the shoulder 22, and the lever 12 to move to apply the brakes. At the instant of brake application, the various parts occupy the positions shown in Figure 2.

As stated above the apparatus is, so to speak, re-set by the subsequent depression of the brake pedal 11, the parts passing through the positions shown in Figure 3 during this movement. When the pedal 11 is subsequently depressed the brake shoes themselves, via the rod 13 and lever 12, will act as an abutment for the spring 15 and during the initial part of the movement, the solenoid armature 25 will be lifted beyond the position indicated at A where it has opened the switch 29 and the pawl 21, moving bodily with the pedal 11, will be caused to enter the slot 23 of the lever 12, the weight of the fulcrum member 51 and impact lever 55 at first tending, and then actually causing, the bell crank lever 44, 45 to move to shift the pawl 21 about its fulcrum 42 and to move the centre pin 46 of the toggle linkage 45, 47, through the dead centre position, once more into engagement with the seating 50 of the pedal 11; said weight also ensuring that the recess 53 of the impact member 51 shall once more be engaged effectively with the pin 48. Upon release of the pedal 11 it will move in an anticlockwise direction relatively to the lever 12 to the extent permitted by the pawl 21 until it reaches the position relatively thereto shown in Figure 1, and the lever 12 will now move in an anticlockwise direction with the pedal 11 until the latter comes into contact with the fixed stop 20 under the influence of the usual brake return springs (not shown). For the sake of clearness in Figure 4, there is shown in addition to the position A of the solenoid armature 25 when it has opened the switch 29, the position traversed thereby at the instant the parts arrive in the position shown in Figure 2 when the brakes are applied. This brake application position of the solenoid armature 25 being indicated at B.

I claim:—

1. In a collision braking device, a main brake operating lever, an auxiliary brake operating lever, means for normally holding the main brake lever and auxiliary lever for movement as a unit, means for operating the auxiliary lever to actuate the brakes on the release of the holding means, and means controlled under collision or like impact of the vehicle for releasing the holding means and permitting automatic operation of the brakes by the auxiliary lever.

2. In a collision braking device for vehicles, a main brake controlling lever, an auxiliary brake controlling lever, means whereby the levers may be connected for unitary movement in applying the brakes, a spring normally tensioned when the levers are arranged for unitary movement to move the auxiliary lever with respect to the main lever, and means responsive to collision impact of the vehicle to release the holding means between the levers and permit the spring to actuate the auxiliary lever to set the brakes.

3. A collision braking device as claimed in claim 1, wherein the means for holding the main and auxiliary levers as a unit is in the form of a detent carried by the main lever and cooperating with a recess formed in the auxiliary lever.

4. A collision braking device as claimed in claim 1, wherein the means for releasing the holding means is electrically operated.

5. A collision braking device as claimed in claim 1, wherein the holding means for maintaining the main and auxiliary levers as a unit is in the form of a detent carried by the main lever and cooperating with the auxiliary lever, together with a solenoid energized under collision impact of the vehicle for releasing the detent.

6. A collision braking device including a main brake operating lever, an auxiliary brake operating lever, a shaft common to both levers, a spring supported by the main lever and acting upon the auxiliary lever to move said latter lever in a direction to set the brakes, a detent carried by the main lever and cooperating with a recess in the auxiliary lever to hold the auxiliary lever against operation by said spring, a solenoid energized under collision impact of the vehicle, and means operated by the solenoid to release the detent and free the auxiliary lever to the influence of said spring.

7. A construction as described in claim 6, including means for limiting movement of the main lever in one direction to thereby provide a fixture against which the spring may operate in the actuation of the auxiliary lever.

8. A construction as defined in claim 7, wherein the detent is pivotally mounted intermediate its length on the main brake lever, toggle linkage connected at one end of the detent, a shoulder on the auxiliary lever engaging said detent, the cooperation of the shoulder and detent insuring operative position of the detent, and a solenoid connected to the toggle linkage, with the latter responsive to solenoid energization to permit the detent to move clear of the auxiliary lever.

CYRIL DOUGLAS TERRY.